June 18, 1957 H. T. BOOTH Re. 24,329

SEALING CONSTRUCTION

Original Filed July 23, 1953

INVENTOR
HARRY T. BOOTH.
BY J. E. Beringer
His ATTORNEY.

United States Patent Office

Re. 24,329
Reissued June 18, 1957

24,329

SEALING CONSTRUCTION

Harry T. Booth, Dayton, Ohio, assignor to United Aircraft Products, Inc., Dayton, Ohio, a corporation of Ohio Original No. 2,772,807, dated December 4, 1956, Serial No. 369,896, July 23, 1953. Application for reissue February 11, 1957, Serial No. 639,593

3 Claims. (Cl. 220—46)

Matter enclosed in heavy brackets [ ] appears in the original patent but forms no part of this reissue specification; matter printed in italics indicates the additions made by reissue.

This invention relates to sealing constructions, and particularly to the use of rubber or rubber like sealing devices in installations subject to relatively wide temperature and pressure differences.

The resilient, deformable O-ring has wide industrial application as an insert between mating structural elements for the purpose of inhibiting passage of fluids between such elements. It is enabled, on account of its resilience to maintain a tight seal even though the pressures of such fluids, and temperature change, may produce a relative separating motion of the structural members. Failure of the O-rings properly to make this compensation have been noted, however, in installations encountering extremely low temperatures. In such installations, therefore, more costly metallic or fibrous seals have been used in place of the rubber O-ring.

To state the problem more specifically, aircraft, for example, now are being designed for quick starts and for effective operation under Arctic conditions. A rubber O-ring, if held under compression over a period of hours at temperatures of —50° F. to —65° F., loses much of its elasticity. Accordingly, when the value of the fluid pressure under control is raised, resulting in a corresponding withdrawing motion of one structural member relatively to the other, the O-ring is unable to follow such motion and hence is unable properly to perform its sealing function. The problem is accented in engine oil coolers which are unheated and unpressurized while the engine is idle. Immediately that the engine is started, however, oil pressures of several hundred pounds per square inch are produced in the cooler and the oil temperature rises rapidly under the rejected heat of the engine.

It has been found that rubber O-rings are unable to recover their elasticity with equal promptness, and may not recover at all.

The instant invention has in view the obviating of these difficulties, it being proposed to make use of a principle of pre-stressing permitting the use of rubber O-rings in installations where they have heretofore been considered inapplicable.

Figure 1:
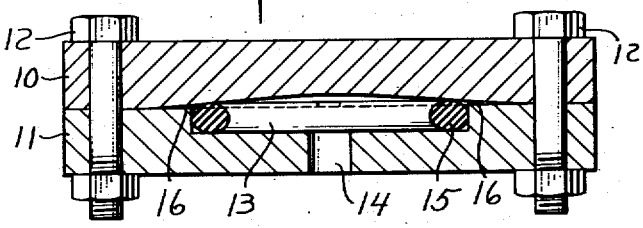
Fig. 1 is a view in cross section of a seal installation, utilizing a principle of pre-stressing in accordance with the present invention.
Figure 2:
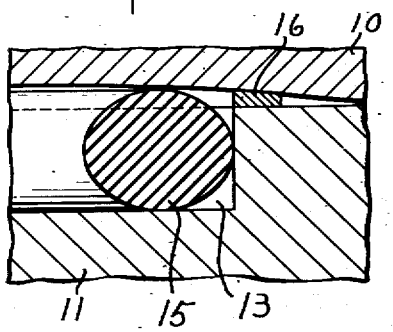
Fig. 2 is an enlarged, fragmentary portion of Fig. 1.

Referring to the drawings, the sealing structure shown is intended to be merely representative of an actual installation, it being understood that the physical aspects of an O-ring installation have infinite variety.

Thus opposing plates 10 and 11 are shown which are in face to face contacting relation, and are so held by bolts 12 passed through the plates near the side edges thereof. The lower plate 11 has a central recess 13 facing the plate 10, and further has a transverse through opening 14. It may be considered that fluid under pressure is admitted to the recess 13 by way of opening 14, in the performance of a function unnecessary to an understanding of the present invention.

Within the recess 13 is an O-ring seal 15 made of a rubber or rubber like resilient deformable material. The seal 15 contacts the bottom of the recess 13, the side thereof, and the internal face of the plate 10, all in a manner to inhibit the escape of pressure fluid from the recess 13 outwardly between the plates 10 and 11. The seal 15 is normally round in cross section and has a diameter somewhat greater than the depth of the recess 13. Accordingly when the plate 10 is fastened to the plate 11, the seal 15 is squeezed between the opposing sealing surfaces and so placed under compression, assuming a substantially oval shape as illustrated. The resilient quality of the seal enables it to follow a relative separating motion of the sealing surface, as may be induced by the fluid pressure admitted to the recess 13.

Since, under low temperature conditions the ability of the ring seal 15 to regain its natural shape is impaired, it is presently contemplated to reduce the requirement in this connection by a pre-stressing of the structural plates 10 and 11. Thus, wedge shaped shims 16 are inserted between the plates 10 and 11 adjacent to the recess 13. In the illustrated instance the lower plate 11 is assumed to be stationarily supported. Accordingly, the result of tightening down the bolts 12, in the presence of the shims 16, is to stress the plate 10 in a manner tending to distend it relatively to the plate 11. It will be understood that by a proper selection of shims 16 in conjunction with the applied clamping pressure, the imposed stress may be made to correspond to the maximum expected fluid pressure in the recess 13 or to any selected value thereof. The shims 16 therefore have the effect of continuously stressing the plate 10 as it is stressed, operationally, by fluid pressure. The elastic requirement of the seal 15 is thereby reduced, and it is relatively immaterial that the seal may be slow to recover from a frozen condition since a following motion of the seal with respect to the plate 10 is unnecessary. In a non-operating condition, the plate 10 is held stressed by the shims 16 even though the fluid pressure in the recess 13 is at a low or zero value. Thus when fluid pressure is reapplied in the recess 13, little or no compensating expansion of the seal is required since the plate 10 has already been stressed its full amount.

As indicated in the drawings, there is an actual deflection of the plate 10 under the opposing thrusts of the bolts 12 and shims 16 equal to the deflection resulting from stressing of the plate by fluid pressure of a selected value. As the pressure in the chamber 13 rises and falls there is an interchange of the deflecting load between the shims and the fluid pressure but the degree of deflection remains the same, assuming of course that the pressure fluid value does not rise above the said selected value.

What is claimed is:

1. A sealing construction, including a pair of non-resilient elements in opposing relation to one another, a resilient deformable ring seal between said elements and spaced inwardly from the edges thereof, non-deformable shim means positioned between said elements in a relatively narrow annular path outwardly of said ring seal, said means permitting a relative approaching motion of said elements sufficient to place said ring seal under compression, and tie means interconnecting said elements at a point radially outwardly of said shim means and tightened to pre-stress said elements about said shim means as a fulcrum.

2. A sealing construction according to claim 1, characterized in that said annular path is located in adjacent concentric relation to said ring seal.

*3. A sealing construction, including a pair of non-re-*

*silient elements in opposing relation to one another, a resilient deformable ring seal between said elements and spaced inwardly from the edges thereof, nondeformable shim means positioned between said elements in a relatively narrow annular path located in adjacent concentric relation to said ring seal, said means permitting a relative approaching motion of said elements sufficient to place said ring seal under compression, and tie means interconnecting said elements at a point radially outwardly of said shim means and of said ring seal and tightened to pre-stress said elements about said shim means as a fulcrum.*

References Cited in the file of this patent or the original patent

UNITED STATES PATENTS

| | | |
|---|---|---|
| 2,035,057 | Farmer | Mar. 24, 1936 |
| 2,272,178 | McDowell et al. | Feb. 10, 1942 |
| 2,384,386 | Malmberg | Sept. 4, 1945 |
| 2,638,243 | Davies | May 12, 1953 |
| 2,639,174 | Farnam | May 19, 1953 |
| 2,679,241 | Dickson | May 25, 1954 |
| 2,695,725 | Chatfield | Nov. 30, 1954 |

FOREIGN PATENTS

| | | |
|---|---|---|
| 24,202 | France (1st addition of 482,469) | Dec. 30, 1914 |